US010367318B1

(12) United States Patent
Hoopengarner

(10) Patent No.: US 10,367,318 B1
(45) Date of Patent: Jul. 30, 2019

(54) MODULAR FIXTURE FOR SUPPLYING POWER, CONTROL SIGNALS, AND/OR DATA COMMUNICATION TO VARIOUS DEVICES

(71) Applicant: Paul Hoopengarner, Plainfield, IN (US)

(72) Inventor: Paul Hoopengarner, Plainfield, IN (US)

( * ) Notice: Subject to any disclaimer, the term of this patent is extended or adjusted under 35 U.S.C. 154(b) by 0 days.

(21) Appl. No.: 16/007,830

(22) Filed: Jun. 13, 2018

(51) Int. Cl.
| | |
|---|---|
| *F21S 8/08* | (2006.01) |
| *F21S 9/02* | (2006.01) |
| *F21S 9/03* | (2006.01) |
| *G01P 3/64* | (2006.01) |
| *H02J 3/38* | (2006.01) |
| *H02J 7/35* | (2006.01) |
| *H04N 5/63* | (2006.01) |
| *H04R 1/02* | (2006.01) |
| *F21V 23/04* | (2006.01) |
| *F21V 23/06* | (2006.01) |
| *H01R 27/02* | (2006.01) |
| *H02S 99/00* | (2014.01) |
| *F21Y 115/10* | (2016.01) |

(52) U.S. Cl.
CPC ............. *H01R 27/02* (2013.01); *F21S 8/086* (2013.01); *F21S 9/026* (2013.01); *F21S 9/035* (2013.01); *F21V 23/0471* (2013.01); *F21V 23/06* (2013.01); *G01P 3/64* (2013.01); *H02J 3/383* (2013.01); *H02J 3/386* (2013.01); *H02J 7/35* (2013.01); *H04N 5/63* (2013.01); *H04R 1/026* (2013.01); *F21Y 2115/10* (2016.08); *H02S 99/00* (2013.01)

(58) Field of Classification Search
CPC .......... H01R 27/02; F21S 8/086; F21S 9/026; F21V 23/0471; F21V 23/06; G01P 3/64; H02J 3/383; H02J 3/386; H02J 7/35; H04N 5/63; H04R 1/026
See application file for complete search history.

(56) References Cited

U.S. PATENT DOCUMENTS

| | | | | |
|---|---|---|---|---|
| 2009/0267540 | A1* | 10/2009 | Chemel | H05B 37/0218 315/297 |
| 2010/0029268 | A1* | 2/2010 | Myer | F21S 2/00 455/426.1 |
| 2015/0237424 | A1* | 8/2015 | Wilker | H04R 1/026 381/150 |

(Continued)

FOREIGN PATENT DOCUMENTS

GB 0708993 * 6/2007 ............. F03D 9/007

*Primary Examiner* — Mary Ellen Bowman
(74) *Attorney, Agent, or Firm* — Ice Miller LLP

(57) ABSTRACT

A modular fixture for supplying power, control signals, and/or data communication to various devices. The modular fixture includes one or more connectors for mating with a wide variety of types of electrical devices. The connectors are coupled to a plurality of conductors within the modular fixture so that the connectors may supply power, control signals, and/or data communication to various devices mated with any of the connectors. Exemplary devices include lighting devices, cameras, wireless communication devices, speaker devices, microphone devices, solar energy devices, and/or wind energy devices. The modular fixture may also be used with other types of devices.

15 Claims, 14 Drawing Sheets

(56) References Cited

U.S. PATENT DOCUMENTS

| | | | |
|---|---|---|---|
| 2015/0260391 A1* | 9/2015 | Wassel | F21V 33/0052 348/373 |
| 2015/0362172 A1* | 12/2015 | Gabriel | G08B 15/001 348/151 |
| 2018/0010778 A1* | 1/2018 | Zhao | F21V 23/002 |
| 2018/0146531 A1* | 5/2018 | Rinko | F21S 8/086 |

* cited by examiner

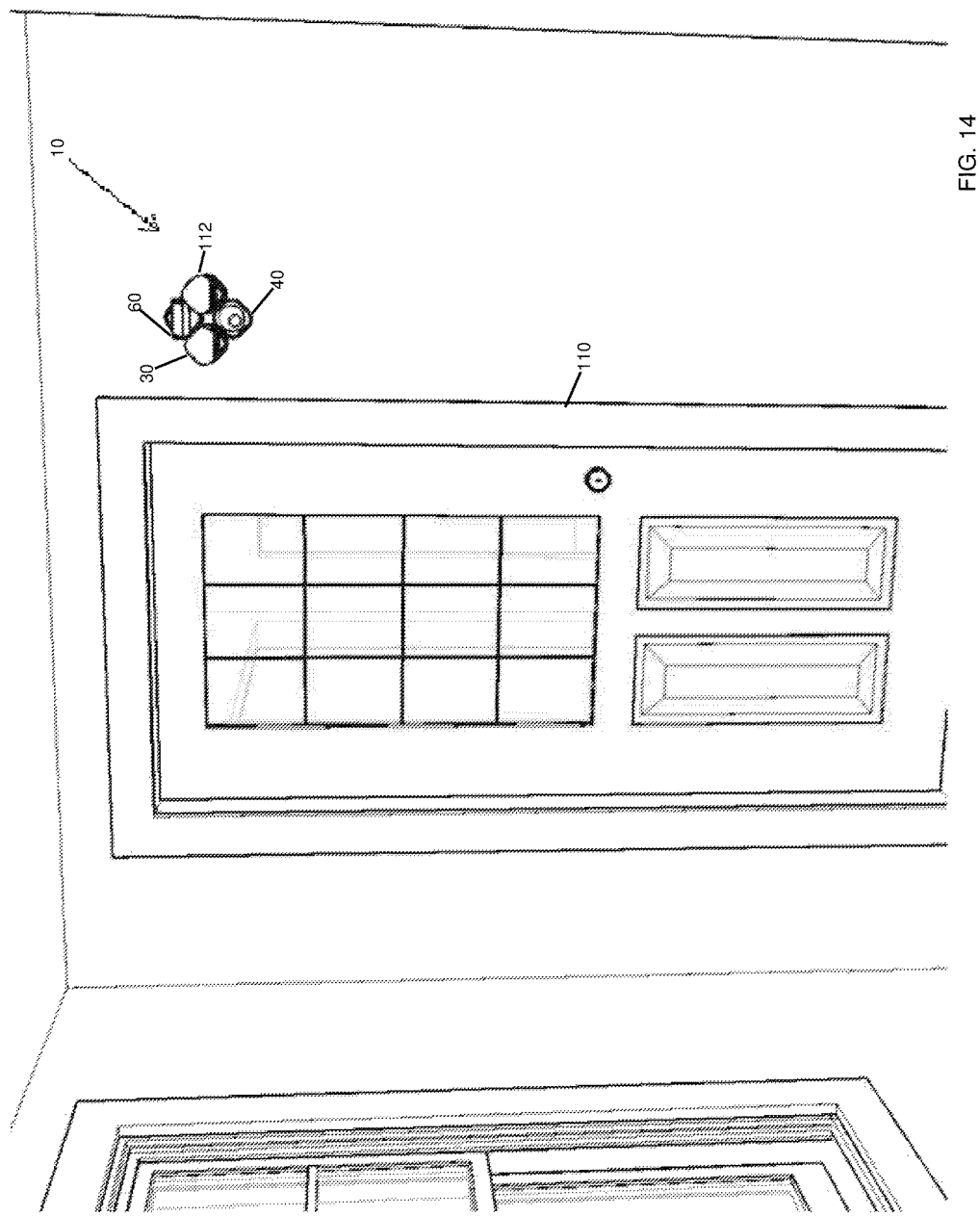

MODULAR FIXTURE FOR SUPPLYING POWER, CONTROL SIGNALS, AND/OR DATA COMMUNICATION TO VARIOUS DEVICES

TECHNICAL FIELD

This patent application relates to fixtures for electronic devices and, more particularly, to a modular fixture for supplying power, control signals, and/or data communication to various devices.

BACKGROUND OF THE DISCLOSED EMBODIMENTS

A light fixture (US English), light fitting (UK English), or luminaire is an electrical device used to create artificial light by use of an electric lamp. Light fixtures have a fixture body and a light socket to hold the lamp and allow for its replacement.

Fixtures may also have a switch to control the light, either attached to the lamp body or attached to the power cable. Permanent light fixtures, such as dining room chandeliers, may use a wall switch to turn them on and off; as such, these fixtures may have no switch on the fixture itself. Other fixtures, such as outdoor light poles, may be turned on and off by control of the power supplied thereto by a remotely located switching device.

Fixtures require an electrical connection to a power source, typically AC mains power, but may also have battery power for camping or emergency lights. Permanent light fixtures may be directly wired. Moveable lamps have a plug and cord so that they can be plugged into a wall socket.

Light fixtures may also have other features, such as reflectors for directing the light, an aperture (with or without a lens), an outer shell or housing for lamp alignment and protection, an electrical ballast or power supply, and a shade to diffuse the light or direct it towards a workspace (e.g., a desk lamp).

Portable light fixtures are often called "lamps", as in table lamp or desk lamp. In technical terminology, the lamp is the light source, which is typically called the light bulb. The term "luminaire" is recommended by the International Electrotechnical Commission (IEC) for technical use.

One problem with light fixtures is that they require specialized equipment and a power source to accomplish only a single function. For example, if the amount of light required from a light fixture increases after the fixture has been installed, only limited increases in lumen output may be affected by increasing the wattage of the light bulb, which may be insufficient to meet the increased light output demand. Additionally, if it is desired to add a different type of device to be powered by the same power source, the light fixture typically will not accommodate the extra device, either as a replacement for the light bulb or to be mounted alongside the light bulb. The light fixture is therefore considered to be a single use device.

SUMMARY OF THE DISCLOSED EMBODIMENTS

In one embodiment, a modular fixture is disclosed, comprising: a housing; a plurality of fixture connectors coupled to the housing; a plurality of conductors coupled to each of the plurality of fixture connectors; a first device including a first device connector operative to mate with each of the plurality of fixture connectors for coupling of the plurality of conductors to the first device; and a second device including a second device connector operative to mate with each of the plurality of fixture connectors for coupling of the plurality of conductors to the second device; wherein the first device and the second device are each of a device type selected from the group consisting of: a lighting device, a camera, a wireless communication device, a speaker device, a microphone device, a combination speaker-microphone device, a solar energy device, a wind energy device, a motion sensor, a speed monitoring device, and an unmanned aerial vehicle charging device; and wherein the first device type is different than the second device type.

In another embodiment, a method is disclosed, comprising the steps of: a) providing a first modular fixture as described above and disposed adjacent a roadway, wherein the first device of the first modular fixture comprises a motion sensor; b) providing a second modular fixture as described above and disposed adjacent the roadway and spaced a distance from the first modular fixture, wherein the first device of the second modular fixture comprises a lighting device; c) sensing an approach of a vehicle with the motion sensor; and d) in response to the sensing of the approach of a vehicle with the motion sensor, illuminating the lighting device.

In another embodiment, a method is disclosed, comprising the steps of: a) providing a modular fixture as described above and disposed adjacent a roadway, wherein the first device of the first modular fixture comprises a motion sensor and the second device of the first modular fixture comprises a speed monitoring device; b) sensing an approach of a vehicle with the motion sensor; and d) in response to the sensing of the approach of a vehicle with the motion sensor, activating the speed monitoring device to measure a speed of the vehicle.

In another embodiment, a method is disclosed, comprising the steps of: a) providing a first modular fixture as described above and disposed adjacent a roadway, wherein the first device of the first modular fixture comprises a first motion sensor; b) providing a second modular fixture of claim 1 disposed adjacent the roadway and spaced a distance from the first modular fixture, wherein the first device of the second modular fixture comprises a second motion sensor; c) sensing the approach of a vehicle with the first motion sensor; d) sensing the approach of the vehicle with the second motion sensor; and e) in response to the sensing of the approach of a vehicle with the second motion sensor, calculating a speed of the vehicle using a time between the sensing of step (c) and the sensing of step (d), and the distance.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 14 is a perspective view of a plurality of modular fixtures mounted adjacent a doorway according to one embodiment of the present disclosure.

DETAILED DESCRIPTION OF THE DISCLOSED EMBODIMENTS

Figure 1:
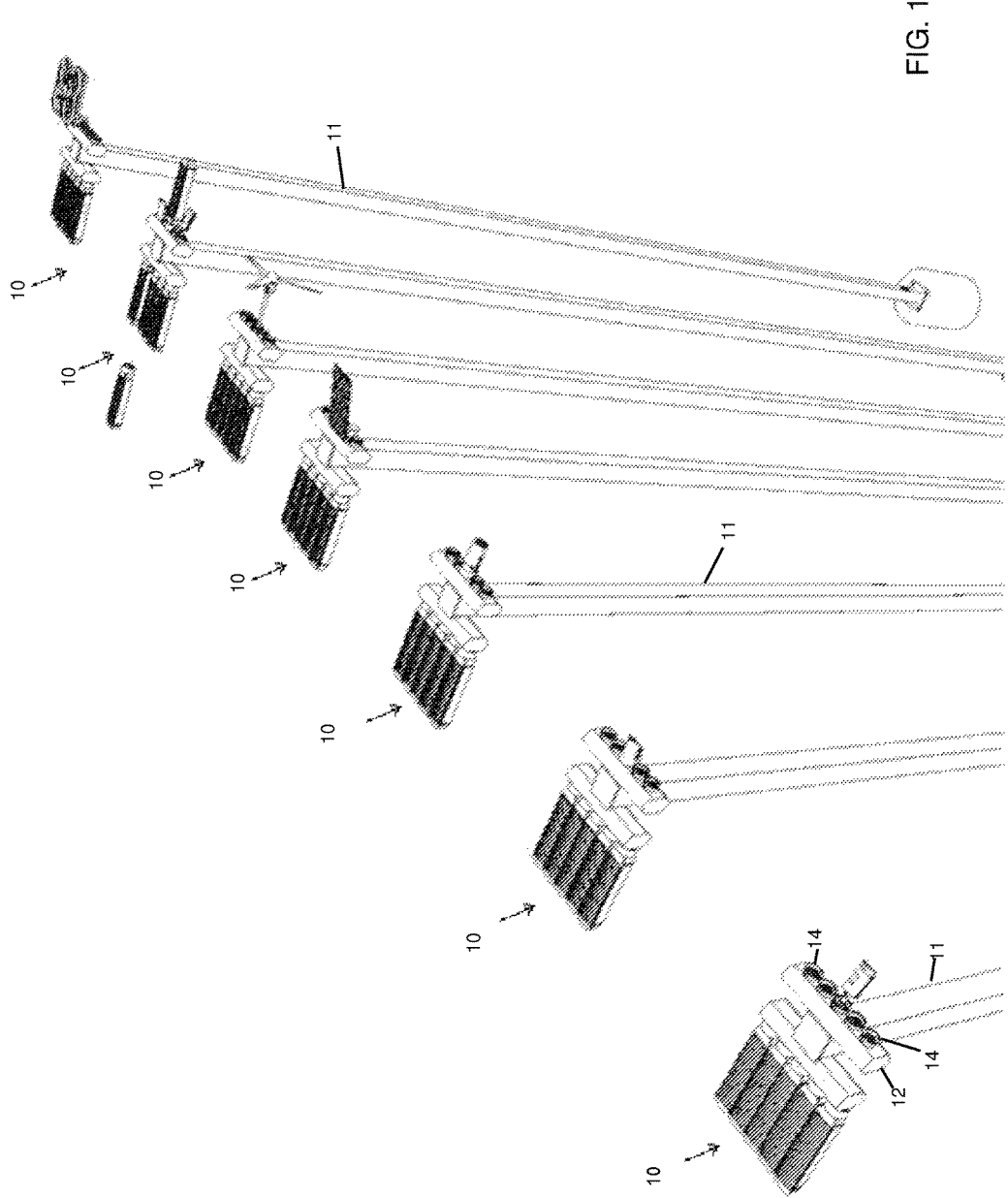
FIG. 1 is a perspective view of a plurality of modular fixtures mounted to a pole according to one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2:
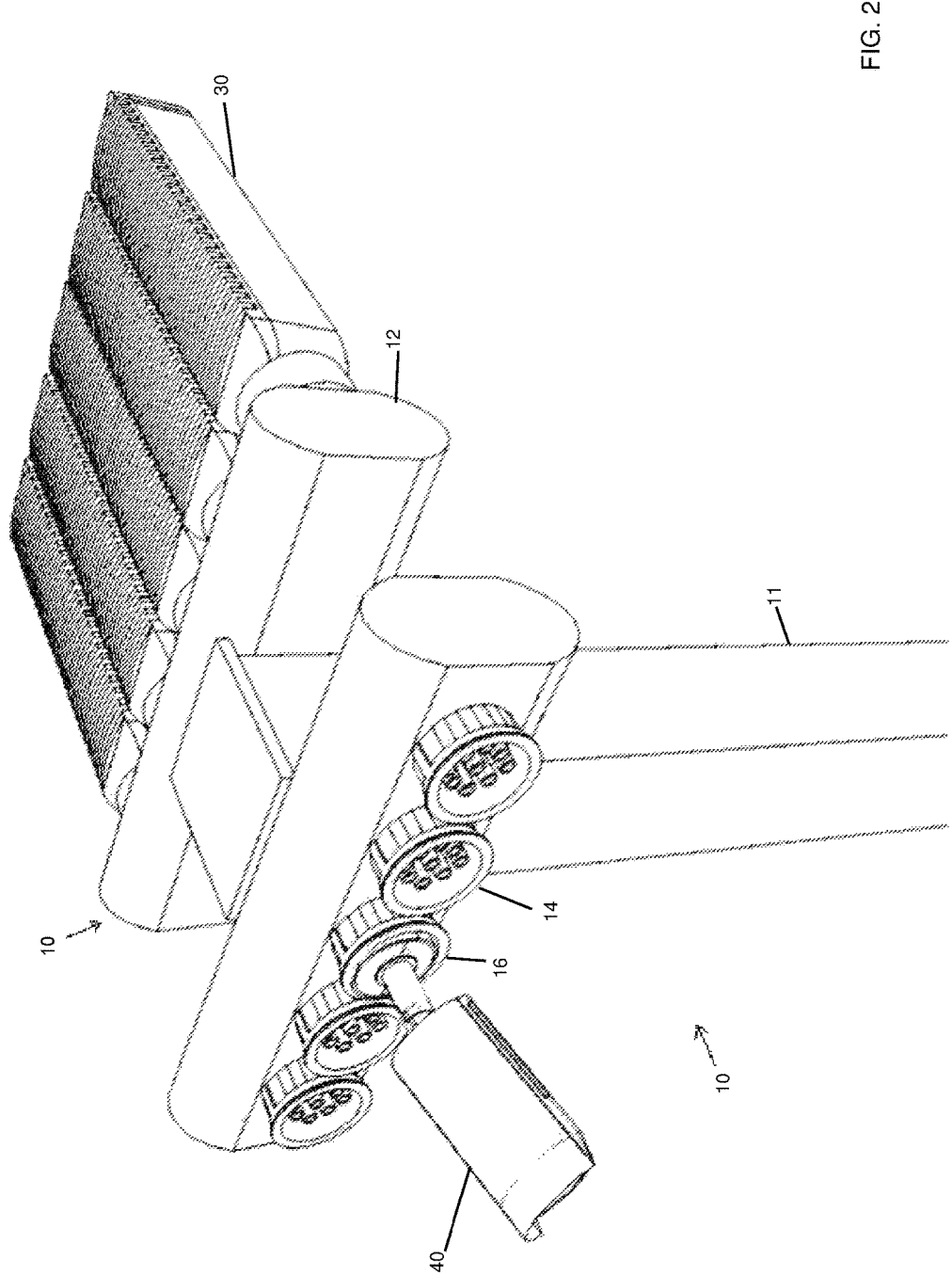
FIG. 2 is a perspective view of a plurality of modular fixtures mounted to a pole according to one embodiment of the present disclosure.
Figure 3:
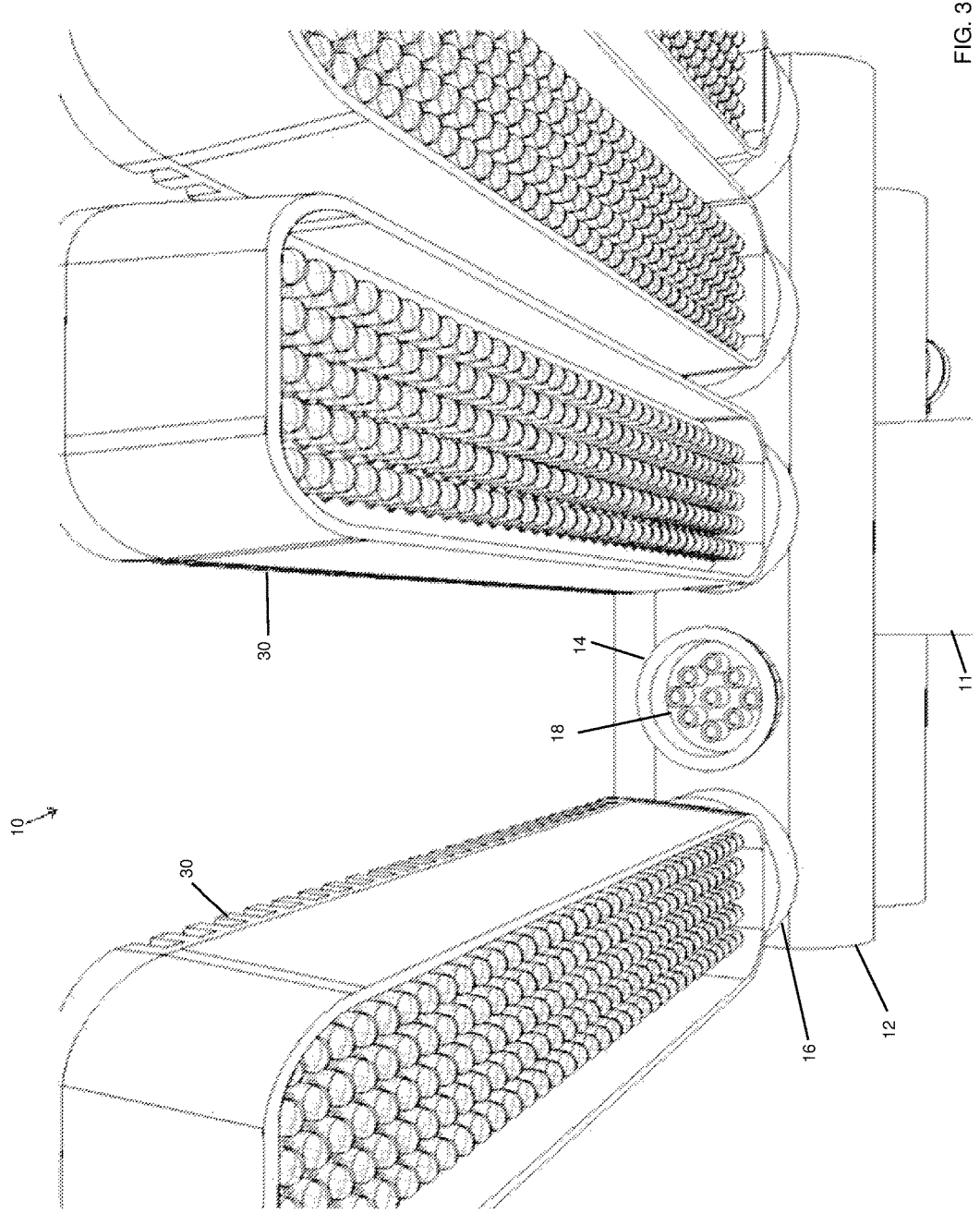
FIG. 3 is a perspective view of a modular fixture according to one embodiment of the present disclosure.

Referring now to FIGS. 1-3, a modular fixture for supplying power, control signals, and/or data communication to various devices is illustrated in accordance with an embodiment of the present disclosure. In the embodiment of FIGS. 1-3, the modular fixture 10 is illustrated as being mounted at the top of a pole 11 (such as a light pole). In other embodiments, the modular fixture 10 may be mounted to any desired location, such as a ceiling or a wall, either interior or exterior to a structure, to name just a few non-limiting examples. The modular fixture 10 of FIGS. 1-3 includes a housing 12 on which is disposed one or more fixture connectors 14 configured to interface with a device connector 16 of one or more various devices (as described in greater detail hereinbelow). Each fixture connector 14 includes a plurality of mating locations 18 configured to mate with the same or fewer number of mating locations (not shown) contained in the device connector 16. Each of the mating locations 18 is configured to provide a power connection, a data communication connection, or a control signal connection to the corresponding mating location of the device connector 16.

Figure 4:
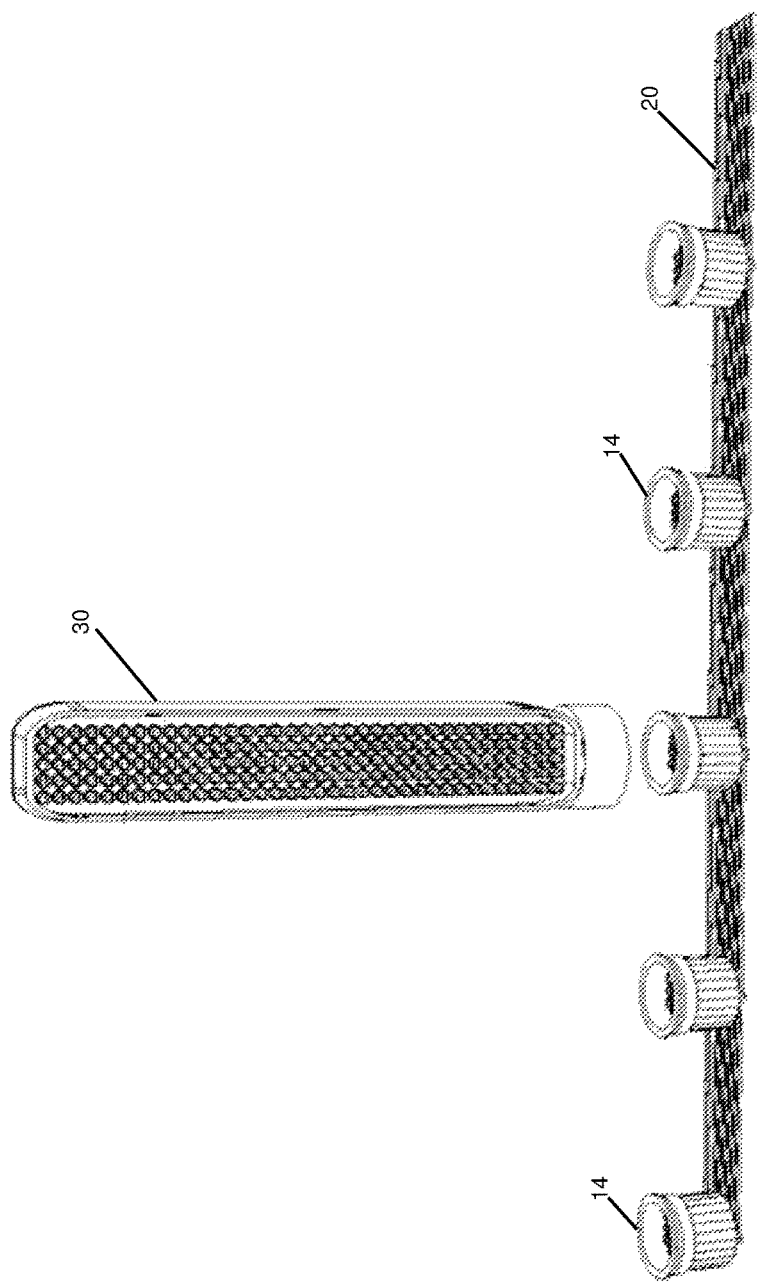
FIG. 4 is a perspective view of a plurality of modular fixture connectors coupled by a plurality of conductors according to one embodiment of the present disclosure.
Figure 5:
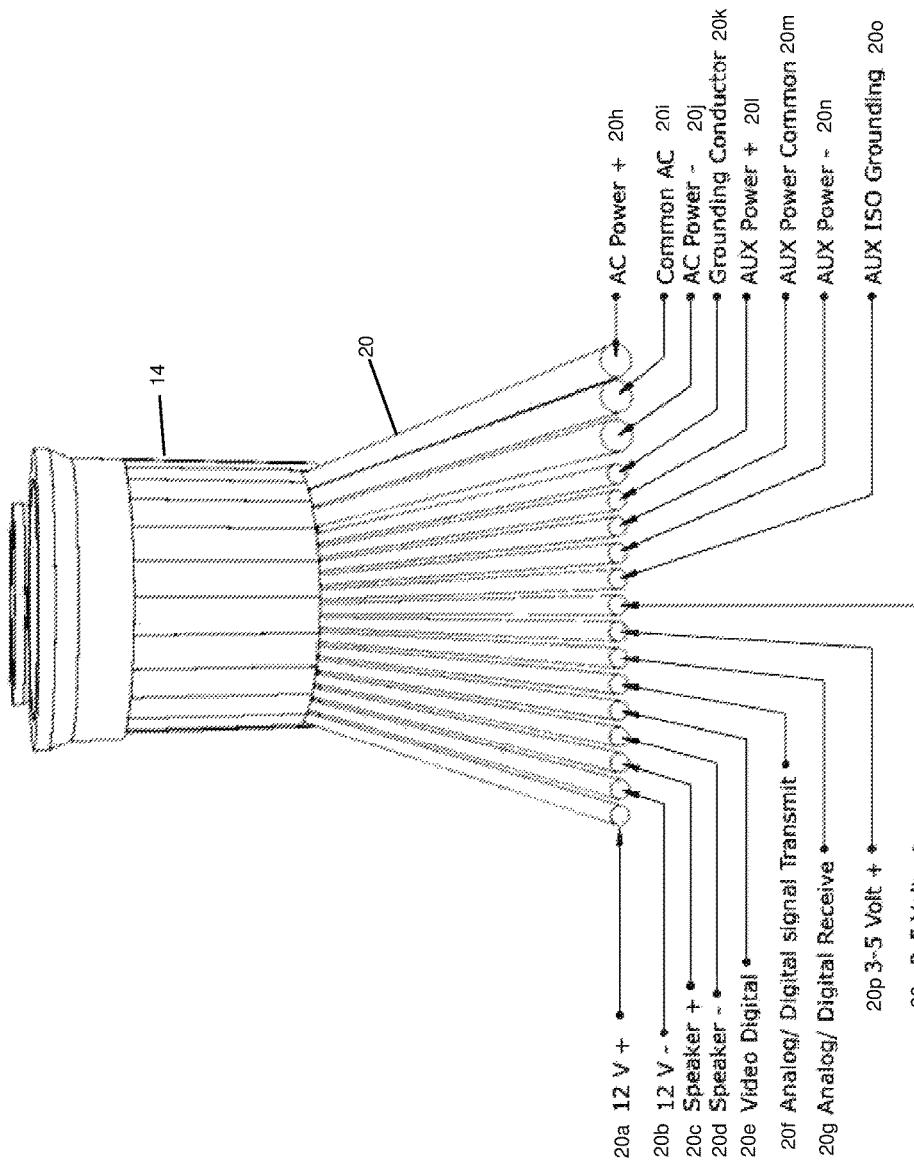
FIG. 5 is a perspective view of a plurality of modular fixture connectors coupled by a plurality of conductors according to one embodiment of the present disclosure.

As illustrated in FIGS. 4-5, in one embodiment each of the mating locations 18 is coupled to one or more of a plurality of conductors 20 disposed within the housing 12. In the illustrated embodiment, these conductors may comprise:

20*a*: 12 volt positive
20*b*: 12 volt negative
20*c*: Speaker positive
20*d*: Speaker negative
20*e*: Video output digital
20*f*: Analog/digital signal transmit
20*g*: Analog/digital signal receive
20*h*: 120/208/240/277/480 volt positive
20*i*: Common input line voltage
20*j*: Neutral
20*k*: Grounding conductor
20*l*: 120/208/240/277/480 volt positive
20*m*: Common input line voltage
20*n*: Neutral
20*o*: Auxiliary grounding
20*p*: 3/5 volt positive
20*q*: 3/5 volt negative It will be appreciated by those skilled in the art from the present disclosure that the functions designated for the various conductors 20, as well as the number of conductors 20, may be variable from application to application. In some embodiments, the conductors 20 collectively provide one or more power connections, one or more data communication connections, and/or one or control signal connections.

Figure 6:
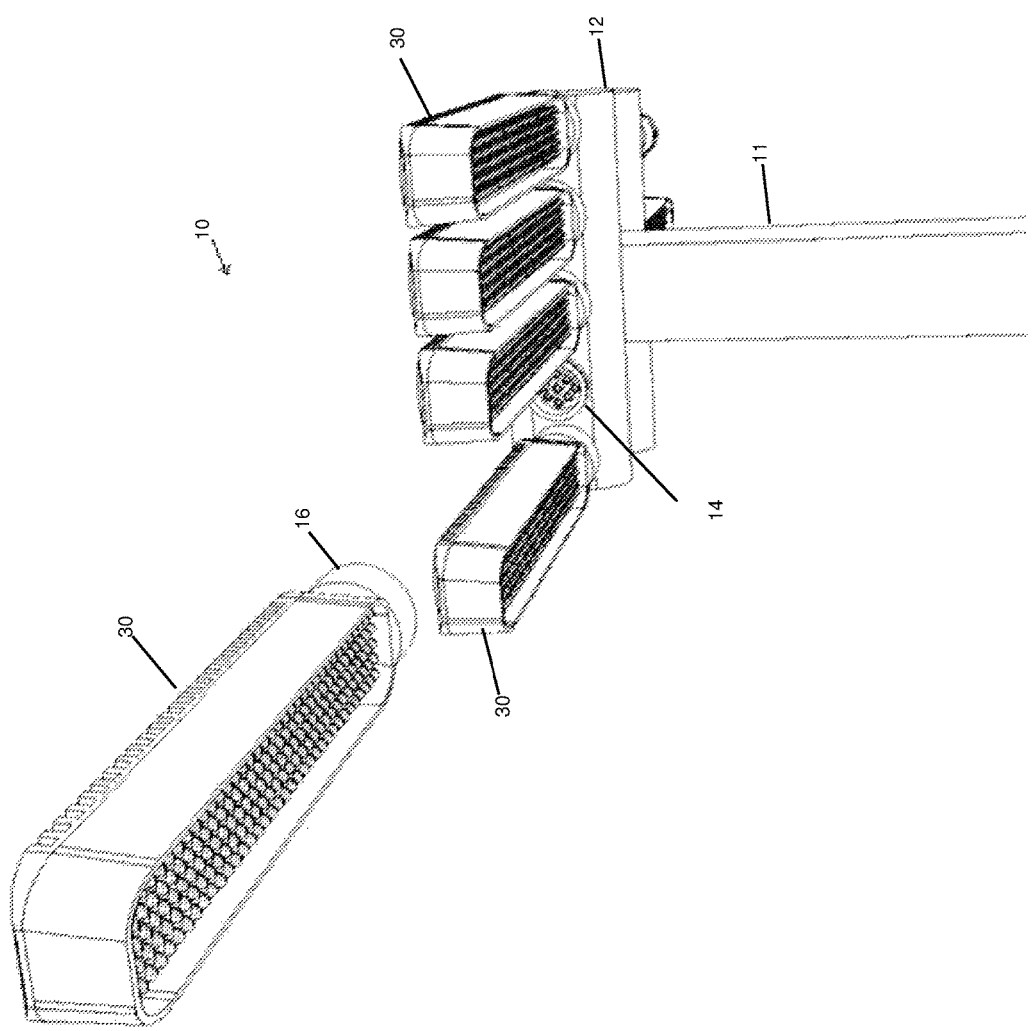
FIG. 6 is a perspective view of a plurality of modular fixtures mounted to a pole with a plurality of lighting devices coupled thereto according to one embodiment of the present disclosure.

In an embodiment, the modular fixture 10 provides multiple fixture connectors 14 to allow for connection of one or more of the same type of device, or of multiple types of devices on one modular fixture 10. So long as each device includes a device connector 16 having mating locations configured to mate with one or more of the mating locations 18 of the fixture connector 14, any type of device may be supported by the modular fixture 10. For example, the modular fixture 10 may be used to power one or more lighting devices 30, one embodiment of which is illustrated in FIG. 6. In the illustrated embodiment, the lighting device 30 comprises an LED lighting device, but those skilled in the art will appreciate from the present disclosure that any lighting technology may be accommodated. Because a single or multiple lighting devices 30 may be connected to the modular fixture 10, the modular fixture 10 may be configured for a wide range of desired lumen output values. Further, if the desired lumen output value changes for the modular fixture 10, one or more lighting devices 30 may be added to, or removed from, the modular fixture 10 in order to supply the desired amount.

Figure 7:
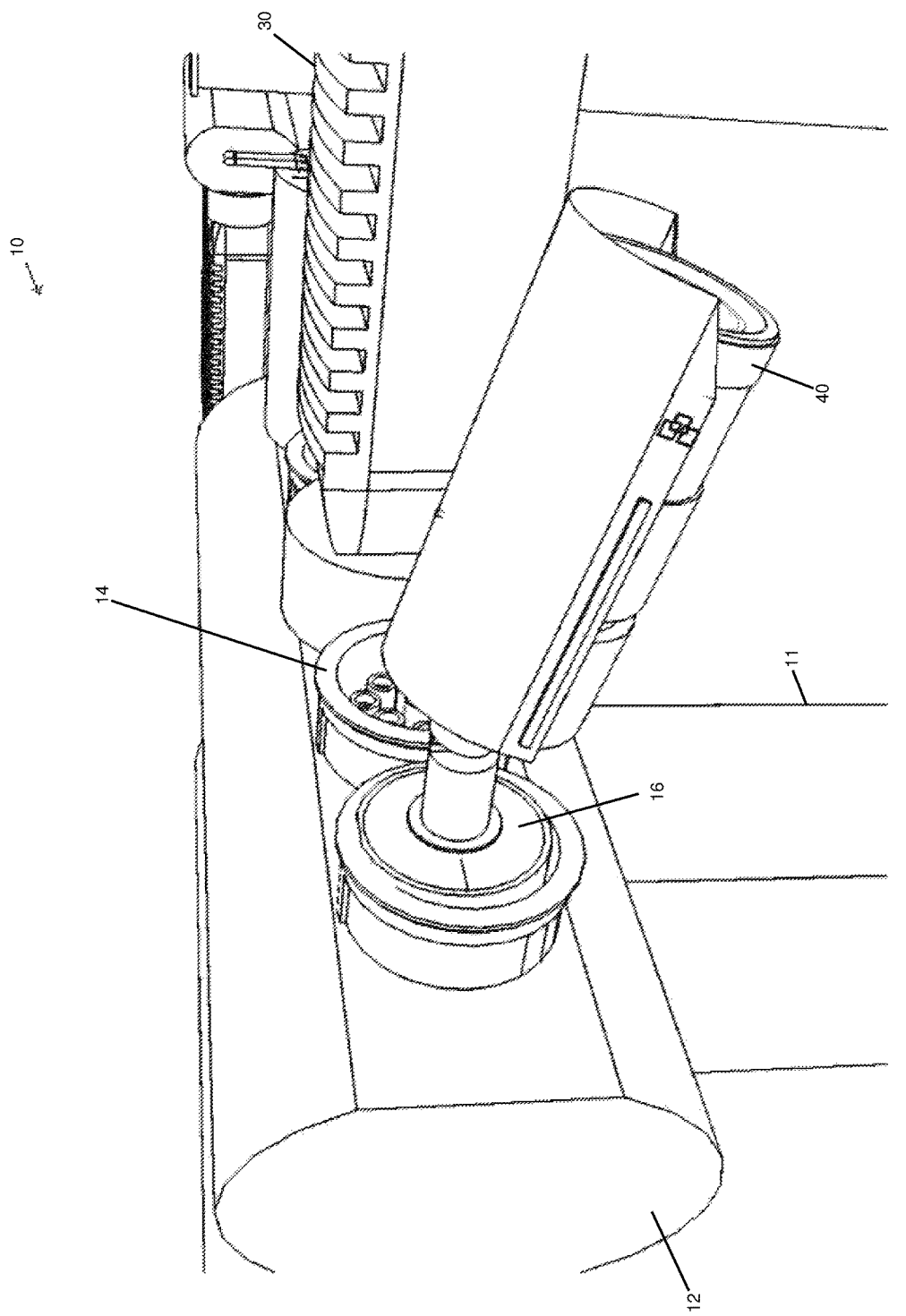
FIG. 7 is a perspective view of a plurality of modular fixtures mounted to a pole with a camera device coupled thereto according to one embodiment of the present disclosure.

In another embodiment, the modular fixture 10 may be used to provide power to and receive video data from one or more cameras 40, one embodiment of which is illustrated in FIG. 7. In the illustrated embodiment, the modular fixture 10 and camera 40 are illustrated as being mounted on top of a pole 11, but those skilled the art will recognize from the present disclosure that such a modular fixture 10 and camera 40 combination may be mounted to any desired location. Furthermore, one or more lighting devices may be connected to the modular fixture 10 to provide illumination of the field of view of the camera 40. One or more of the conductors 20 may be used to provide control signals to the camera 40 to move the camera 40 in a desired direction, while one or more of the conductors 20 may be used to transmit still and/or video images captured by the camera 40 to a remote location. It should be appreciated that, because of the modular nature of the modular fixture 10, it is not necessary that use of a camera 40 be envisioned when the modular fixture 10 is installed at a location, as the camera 40 may easily be added at a later time by simply mating its device connector 16 to one of the fixture connectors 14. Likewise, if it is later determined that a camera 40 is no longer needed at the location of the modular fixture 10, the camera 40 may be removed therefrom, freeing up a fixture connector for another use and allowing the camera 40 to be used at a different modular fixture 10 location.

Figure 8:
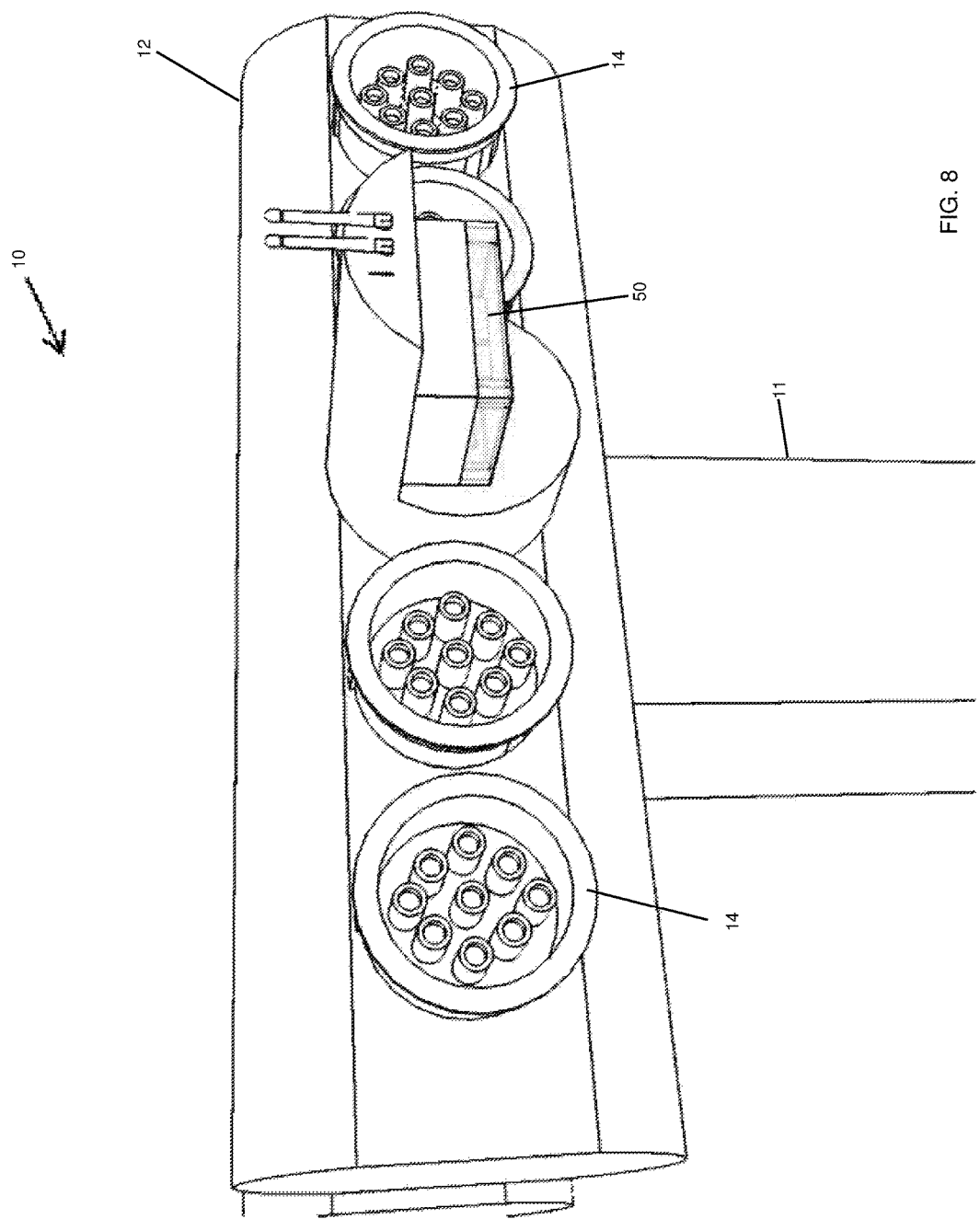
FIG. 8 is a perspective view of a plurality of modular fixtures mounted to a pole with a wireless communication device coupled thereto according to one embodiment of the present disclosure.

In the embodiment illustrated in FIG. 8, one or more wireless communication devices 50 may be mated to one or more of the fixture connectors 14 of the modular fixture 10. Non-limiting examples of wireless communication devices 50 comprise WiFi wireless local area network (with or without an internet access point), Arduino microcontroller devices, cellular telephone antenna extenders, or any other device that utilizes wireless communication.

Figure 9:
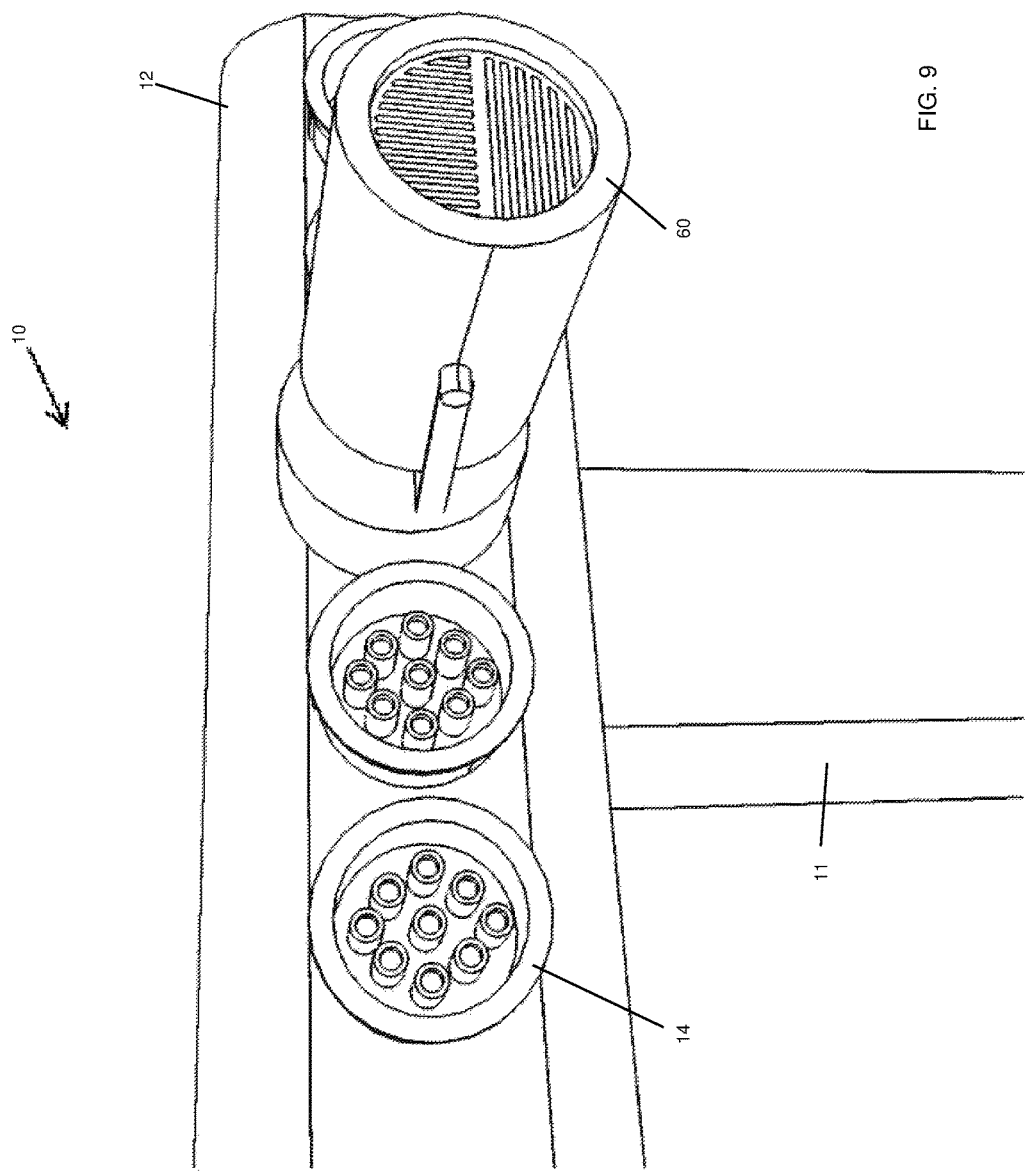
FIG. 9 is a perspective view of a plurality of modular fixtures mounted to a pole with a speaker and/or microphone device coupled thereto according to one embodiment of the present disclosure.

In the embodiment illustrated in FIG. 9, one or more speaker and/or microphone devices 60 may be mated to one or more of the fixture connectors 14 of the modular fixture 10. Non-limiting examples of speaker and/or microphone devices 60 comprise speakers, microphones, public address systems, tornado warning sirens (or other warning devices), intercoms, or any other device that utilizes a speaker and/or microphone.

Figure 10:
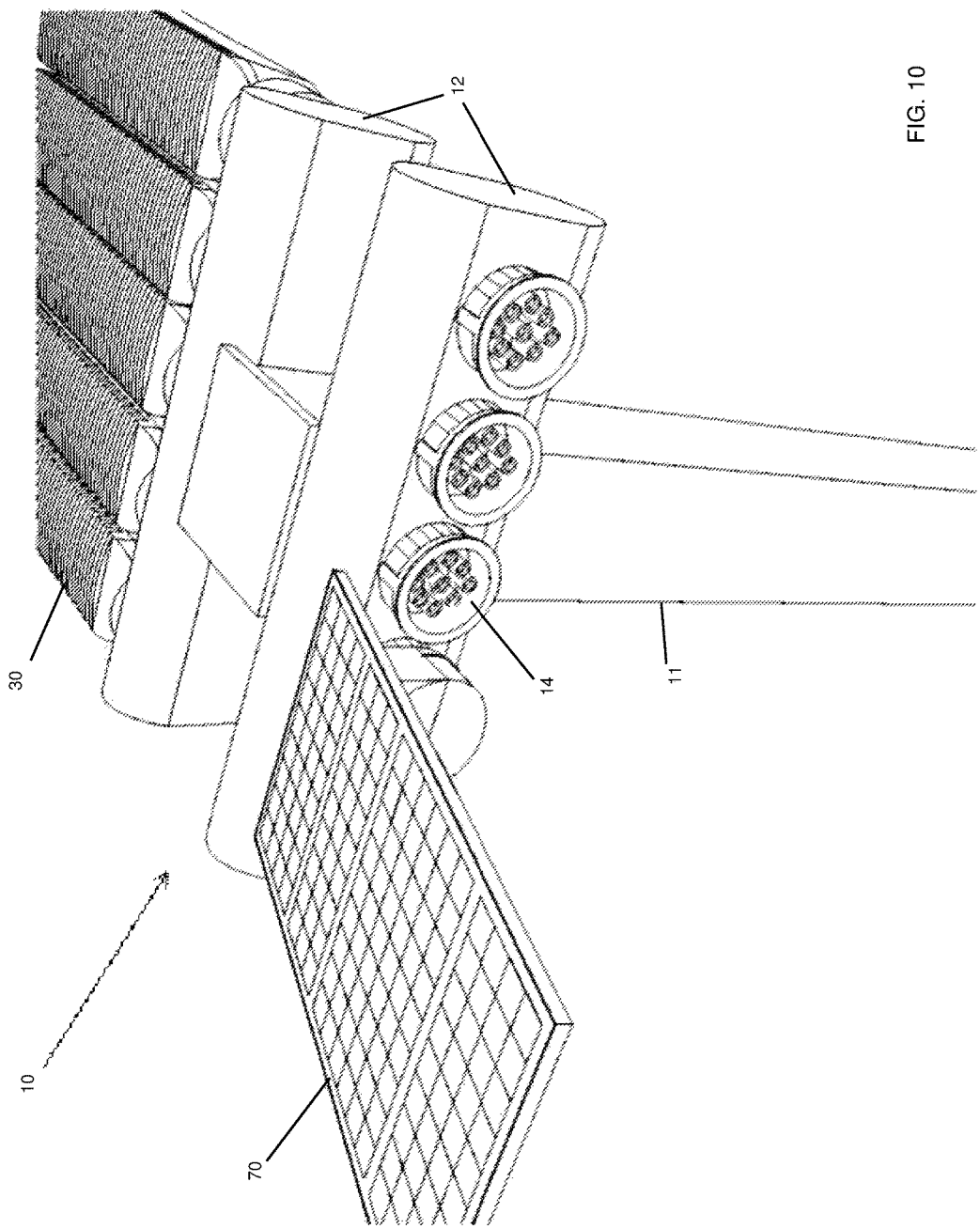
FIG. 10 is a perspective view of a plurality of modular fixtures mounted to a pole with a solar energy device coupled thereto according to one embodiment of the present disclosure.

In the embodiment illustrated in FIG. 10, one or more solar energy devices 70 (such as a photovoltaic cell, for example) may be mated to one or more of the fixture connectors 14 of the modular fixture 10. Non-limiting examples of solar energy devices 70 comprise solar cells, solar cell arrays, or any other device that may generate energy when exposed to sunlight. The solar energy device 70 may output energy to the modular fixture 10 that is provided back to the utility power grid (net metering), used to charge a battery 72 (see FIG. 11) that may power the modular fixture 10 when energy from the utility power grid is unavailable, or used to directly power (or partially power) any of the devices connected to the modular fixture 10.

Figure 11:
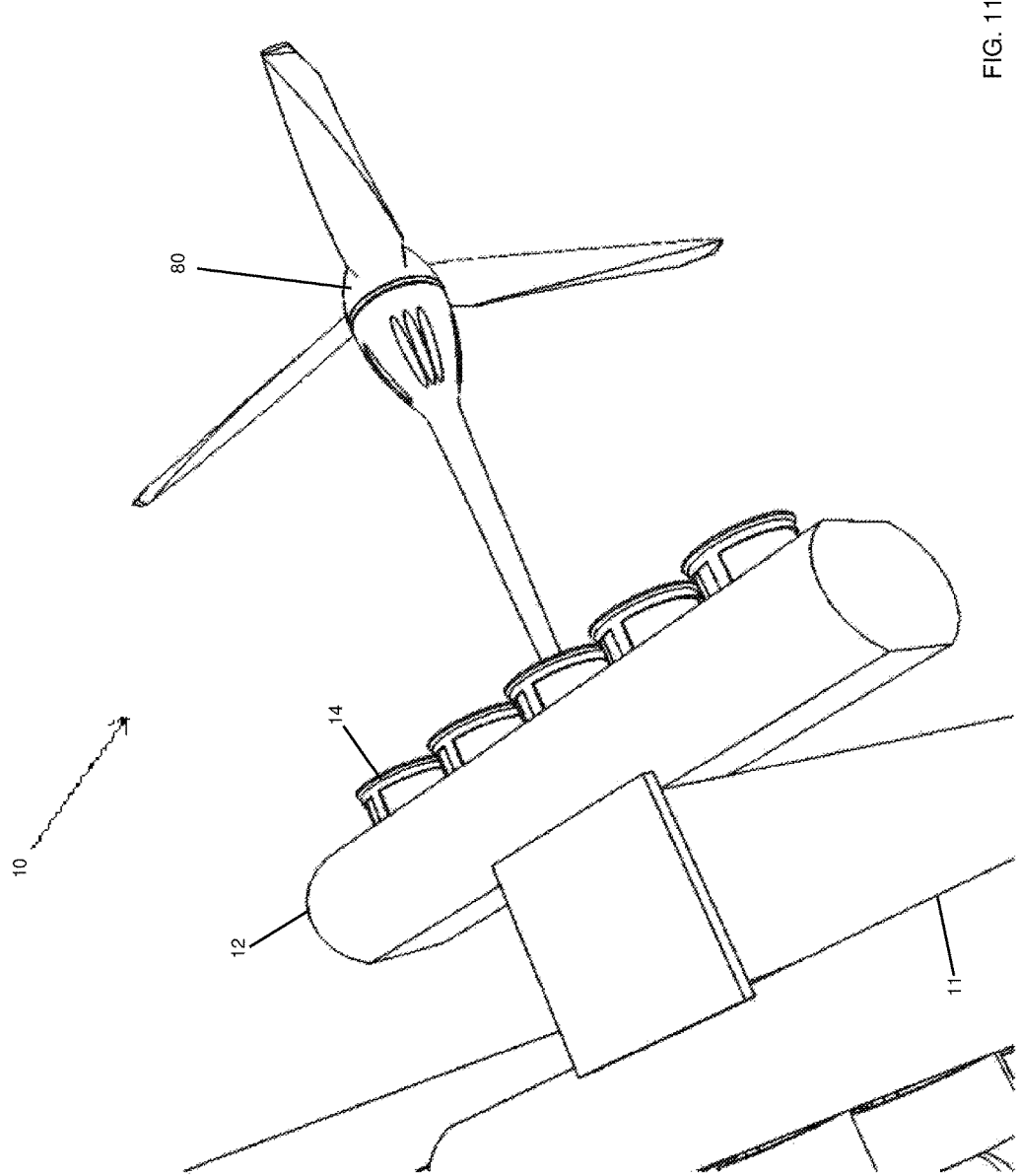
FIG. 11 is a perspective view of a plurality of modular fixtures mounted to a pole with a wind energy device and a battery pack coupled thereto according to one embodiment of the present disclosure.

In the embodiment illustrated in FIG. 11, one or more wind energy devices 80 (such as a wind-driven turbine, for example) may be mated to one or more of the fixture connectors 14 of the modular fixture 10. The wind energy device 70 may output energy to the modular fixture 10 that is provided back to the utility power grid (net metering), used to charge a battery 72 that may power the modular fixture 10 when energy from the utility power grid is unavailable, or used to directly power (or partially power) any of the devices connected to the modular fixture 10.

Figure 12:
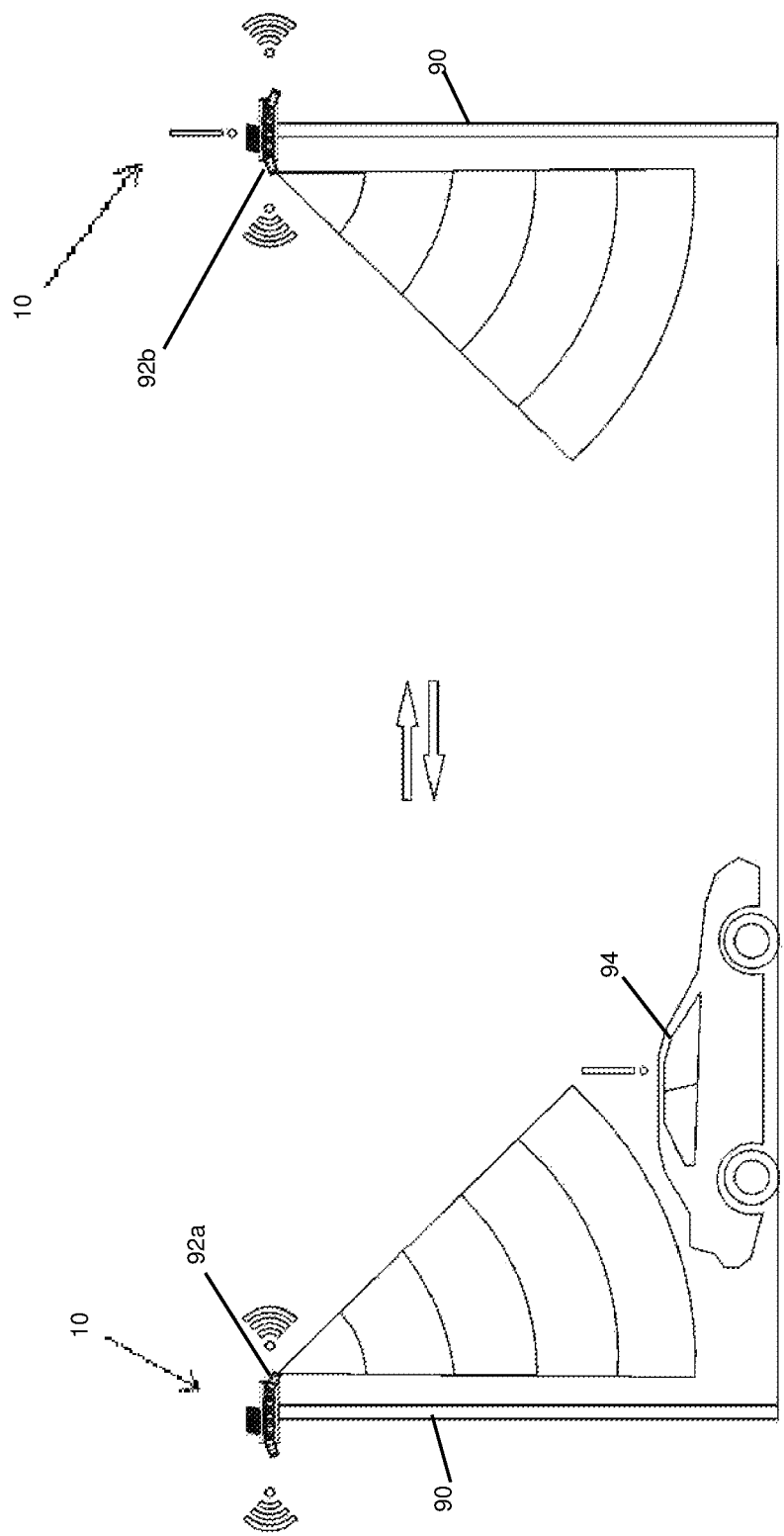
FIG. 12 is a perspective view of a plurality of modular fixtures mounted to a plurality of poles positioned along a roadway according to one embodiment of the present disclosure.

A great many other functionalities may be implemented using the modular fixture 10. For example, as shown in FIG. 12, if the modular fixture 10 is utilized for street/highway lighting application (i.e., on poles 90 situated next to the roadway), a sensor 92 can be coupled to one of the fixture connectors 14 wherein the sensor 92 is configured to sense a vehicle 94 approaching in the roadway. The sensed approach of a vehicle 94 in the roadway could be used for many purposes. For example, the sensed approach of a vehicle 94 could be used to activate power to lighting devices 30 coupled to modular fixtures 10 further down the roadway, so that the lighting devices 30 do not have to be left illuminated (and hence using power) when no vehicles 94 are present on that section of roadway. Additionally or alternatively, the sensed approach of a vehicle 94 can be used to activate a speed monitoring device to check the speed of the vehicle 94. Additionally or alternatively, sensors 92a and 92b on successive modular fixtures 10 can sense the approach of the same vehicle 94, making it easy to calculate the vehicle's speed knowing the distance between the modular fixtures 10 and the time between vehicle sensing by both sensors 92a and 92b. Additionally or alternatively, if a vehicle 94 is determined to be speeding, a signal light (such as a red light to name one non-limiting example) may be illuminated on a modular fixture 10 further down the roadway, alerting the driver that he is speeding. Additionally or alternatively, sensing the speeding of a vehicle 94 could be used to activate a camera device 40 on the modular fixture 10 or a modular fixture 10 further down the roadway to take a picture of the vehicle and/or its license plate for use by law enforcement personnel.

Figure 13:
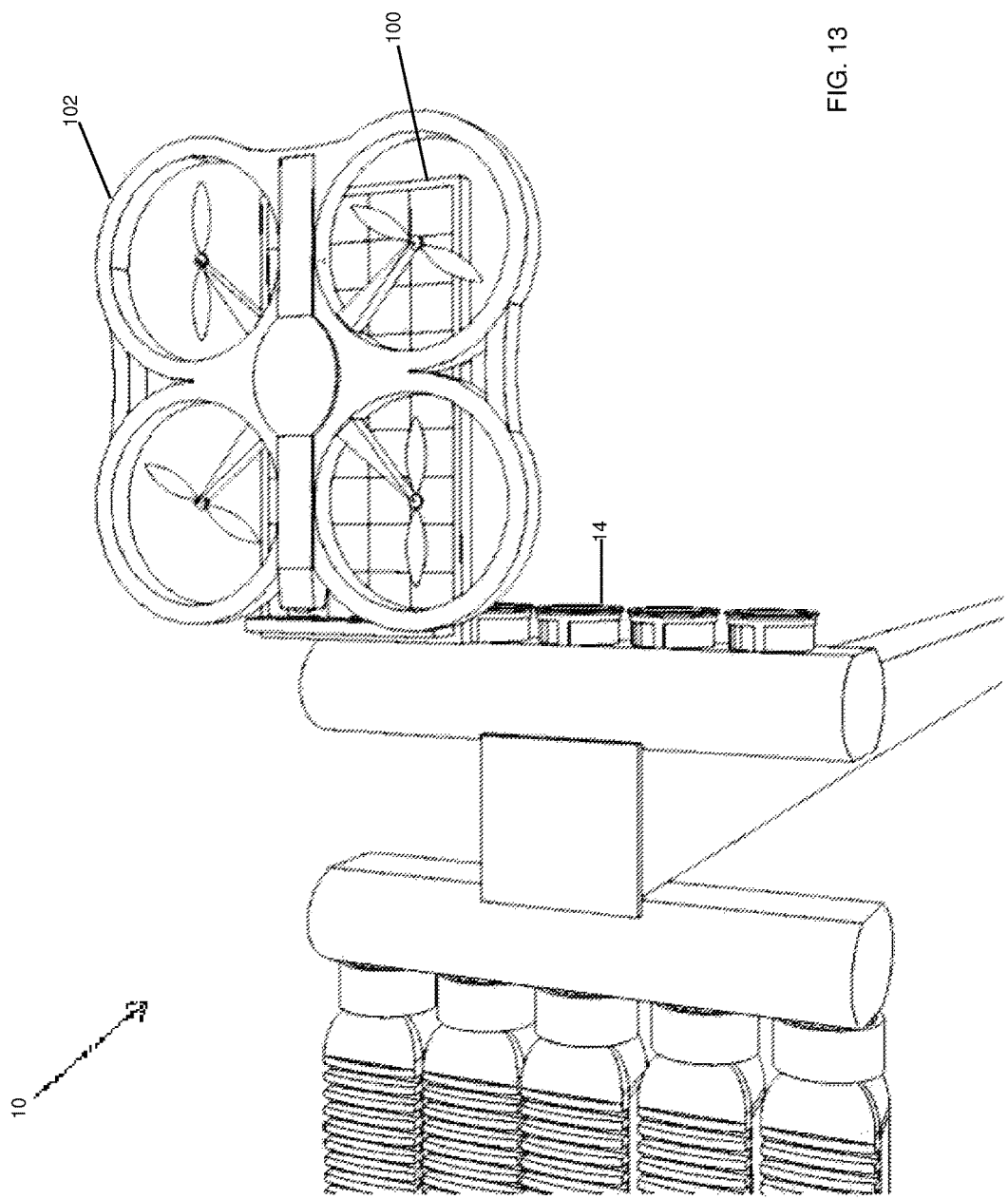
FIG. 13 is a perspective view of a plurality of modular fixtures mounted to a pole with an unmanned aerial vehicle charging device coupled thereto according to one embodiment of the present disclosure.

In another embodiment, as shown in FIG. 13, an unmanned aerial vehicle (UAV or drone) charging device 100 may be coupled to one of the fixture connectors 14. A drone 102 can safely nest on this charging device 100, charge its battery, and then take off as needed.

In another embodiment, as shown in FIG. 14, the modular fixture 10 may be installed on or adjacent a doorway 110. A motion sensor 112 coupled to one of the fixture connectors 14 can initiate a security sequence upon sensing a person approaching the doorway 110. For example, the sensed approach of a person may trigger a lighting device 30 coupled to the modular fixture 10 to be activated, a camera device 40 can be activated, and an intercom device 60 can be activated. This will allow a party at a remote location to see the approach of the person, and enable the party to converse with the person using the intercom device 60. Again, this functionality can be retrofit to the modular fixture 10 without the need to realize the functionality would be desired at the time the modular fixture 10 was originally installed.

It will be appreciated that the device 10 embodiments disclosed herein allow a power fixture to be installed at a location, hardwired or installed with a connector to allow disconnecting of the power fixture so that it can be used in different locations, wherein the modular fixture 10 design allows a great variety of devices to be used therewith, with the modular fixture 10 providing power to the devices, control signals to and/or from the devices, and providing data to and/or from the devices. The modular nature of the modular fixture 10 allows the configuration and functionality of the modular fixture 10 to be easily changed over time, as functional demands change and/or as new devices become available for use with the modular fixture 10.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:
1. A modular fixture, comprising:
  a housing;
  a plurality of fixture connectors coupled to the housing;
  a plurality of conductors coupled to each of the plurality of fixture connectors;

a first device including a first device connector operative to mate with each of the plurality of fixture connectors for coupling of the plurality of conductors to the first device; and a second device including a second device connector operative to mate with each of the plurality of fixture connectors for coupling of the plurality of conductors to the second device;

wherein the first device and the second device are each of a device type selected from the group consisting of: a lighting device, a camera, a wireless communication device, a speaker device, a microphone device, a combination speaker-microphone device, a solar energy device, a wind energy device, a motion sensor, a speed monitoring device, and an unmanned aerial vehicle charging device; and wherein the first device type is different than the second device type.

2. The modular fixture of claim 1, further comprising a pole, wherein the housing is mounted to the pole.

3. The modular fixture of claim 1, wherein the plurality of conductors provide a power connection, a data communication connection, and a control signal connection to each of the plurality of fixture connectors.

4. The modular fixture of claim 1, wherein each of the plurality of conductors supplies an operating function to each of the plurality of fixture connectors selected from the group consisting of: 12 volt positive, 12 volt negative, Speaker positive, Speaker negative, Video output digital, Analog/digital signal transmit, Analog/digital signal receive, 120/208/240/277/480 volt positive, Common input line voltage, Neutral, Grounding conductor, 120/208/240/277/480 volt positive, Auxiliary grounding, 3/5 volt positive, and 3/5/volt negative.

5. The modular fixture of claim 1, wherein the lighting device comprises an LED lighting device.

6. The modular fixture of claim 3, wherein the first device comprises a camera, and the power connection provides power to the camera, the control signal connection provides control signals to the camera to move the camera, and the data communication connection is operative to transmit still or video images from the camera.

7. The modular fixture of claim 1, wherein the wireless communication device is selected from the group consisting of: a WiFi wireless local area network, an Arduino microcontroller device, and a cellular telephone antenna extender.

8. The modular fixture of claim 1, wherein the speaker is selected from the group consisting of: a speaker, a public address system, and a tornado warning siren.

9. The modular fixture of claim 1, wherein the combination speaker-microphone device comprises an intercom.

10. The modular fixture of claim 1, wherein the solar energy device is selected from the group consisting of: a photovoltaic cell, a solar cell, and a solar cell array.

11. The modular fixture of claim 1, wherein the first device comprises a solar energy device and is operative to perform a function selected from the group consisting of: provide energy back to the electric utility power grid, charge a battery operatively coupled to the modular fixture, and provide electrical power to the second device.

12. The modular fixture of claim 1, wherein the wind energy device comprises a wind-driven turbine and is operative to perform a function selected from the group consisting of: provide energy back to the electric utility power grid, charge a battery operatively coupled to the modular fixture, and provide electrical power to the second device.

13. A method, comprising the steps of:
a) providing a first modular fixture of claim 1 disposed adjacent a roadway, wherein the first device of the first modular fixture comprises a motion sensor;
b) providing a second modular fixture of claim 1 disposed adjacent the roadway and spaced a distance from the first modular fixture, wherein the first device of the second modular fixture comprises a lighting device;
c) sensing an approach of a vehicle with the motion sensor; and
d) in response to the sensing of the approach of a vehicle with the motion sensor, illuminating the lighting device.

14. A method, comprising the steps of:
a) providing a modular fixture of claim 1 disposed adjacent a roadway, wherein the first device of the first modular fixture comprises a motion sensor and the second device of the first modular fixture comprises a speed monitoring device;
b) sensing an approach of a vehicle with the motion sensor; and
d) in response to the sensing of the approach of a vehicle with the motion sensor, activating the speed monitoring device to measure a speed of the vehicle.

15. A method, comprising the steps of:
a) providing a first modular fixture of claim 1 disposed adjacent a roadway, wherein the first device of the first modular fixture comprises a first motion sensor;
b) providing a second modular fixture of claim 1 disposed adjacent the roadway and spaced a distance from the first modular fixture, wherein the first device of the second modular fixture comprises a second motion sensor;
c) sensing the approach of a vehicle with the first motion sensor;
d) sensing the approach of the vehicle with the second motion sensor; and
e) in response to the sensing of the approach of a vehicle with the second motion sensor, calculating a speed of the vehicle using a time between the sensing of step (c) and the sensing of step (d), and the distance.

* * * * *